US011124106B2

(12) United States Patent
Christian (10) Patent No.: US 11,124,106 B2
(45) Date of Patent: Sep. 21, 2021

(54) VEHICLE LIFT

(71) Applicant: Brad Christian, San Clemente, CA (US)

(72) Inventor: Brad Christian, San Clemente, CA (US)

(*) Notice: Subject to any disclaimer, the term of this patent is extended or adjusted under 35 U.S.C. 154(b) by 0 days.

(21) Appl. No.: 14/999,844

(22) Filed: Jul. 8, 2016

(65) Prior Publication Data

US 2018/0009360 A1 Jan. 11, 2018

(51) Int. Cl.
*B60P 1/44* (2006.01)
*B66F 7/16* (2006.01)
*B66F 7/28* (2006.01)

(52) U.S. Cl.
CPC .......... *B60P 1/4471* (2013.01); *B60P 1/4414* (2013.01); *B66F 7/16* (2013.01); *B66F 7/28* (2013.01)

(58) Field of Classification Search
CPC ........ B66F 7/0641; B66F 7/0616; B66F 7/24; B66F 7/243; B60P 3/122; B60P 3/1033; B60P 1/4471; B60P 1/4414; B60P 1/4442; B60R 9/00; B60R 9/06; B60R 9/10
USPC ....................................................... 414/462
See application file for complete search history.

(56) References Cited

U.S. PATENT DOCUMENTS

| | | | | |
|---|---|---|---|---|
| 1,378,632 A | * | 5/1921 | Swope | B66F 7/24 254/92 |
| 1,528,934 A | * | 3/1925 | Francis McMahon | B66F 7/243 254/88 |
| 1,751,874 A | * | 3/1930 | Moore | B66F 7/24 254/91 |
| 2,980,271 A | * | 4/1961 | Ulinski | B66F 9/065 414/685 |
| 3,416,677 A | * | 12/1968 | Abfalter | B60P 1/4442 414/545 |
| 4,815,638 A | * | 3/1989 | Hutyra | B60R 9/10 224/516 |
| 4,940,096 A | * | 7/1990 | Johnson | A01B 59/043 172/443 |
| 6,497,541 B2 | * | 12/2002 | Pawluk | B60P 3/08 410/26 |
| 7,232,285 B1 | * | 6/2007 | Ruch | B60P 1/4421 254/10 R |

(Continued)

FOREIGN PATENT DOCUMENTS

GB 2014540 A * 8/1979 ............ B66F 7/0625

*Primary Examiner* — Glenn F Myers
(74) *Attorney, Agent, or Firm* — Gordon E. Gray, III; Gray Law Firm (57) ABSTRACT

The present invention is a vehicle lift. In particular, the present invention is directed to a vehicle lift that has an adjustable vehicle receiver mount that is vertically adjustable and horizontally adjustable. The vehicle receiver mount has two lifting arms and two support arms pivotally attached. The lifting arms are each pivotally attached to a platform shoe and the support arms are attached to vertical rotation cups. The extruded aluminum vehicle platform is pivotally mounted on four pivot arms. The pivot arms are pivotally attached to the platform. The lift is attached to the vehicle receiver mount and is also attached to a crossbar mounted between the two lifting arms. The drive is preferably a single unit hydraulic drive. The vehicle receiver mount also has a towing receiver. The vehicle platform preferably has two channels with tethering and anchoring hardware, a vehicle stop and entrance ramp mounted on the channels.

1 Claim, 14 Drawing Sheets

(56) References Cited

U.S. PATENT DOCUMENTS

| | | | | |
|---|---|---|---|---|
| 7,513,333 B2* | 4/2009 | Davis | ............ | E06C 5/02 |
| | | | | 182/115 |
| 8,777,544 B1* | 7/2014 | Carpenter | ............ | B65D 85/68 |
| | | | | 414/430 |
| 2003/0165376 A1* | 9/2003 | Bruno | ............ | A61G 3/0209 |
| | | | | 414/462 |
| 2003/0201289 A1* | 10/2003 | Swain | ............ | B60R 9/06 |
| | | | | 224/519 |
| 2008/0085176 A1* | 4/2008 | Statkus | ............ | B60P 3/07 |
| | | | | 414/462 |
| 2012/0056142 A1* | 3/2012 | Christian | ............ | B60P 3/122 |
| | | | | 254/93 R |
| 2015/0203049 A1* | 7/2015 | Eichmann | ............ | B60D 1/42 |
| | | | | 224/509 |

\* cited by examiner

VEHICLE LIFT

TECHNICAL FIELD

The present invention is a vehicle lift. In particular, the present invention is directed to a vehicle lift that can be mounted to the rear of a vehicle, such as a passenger vehicle, truck, or recreational vehicle to lift vehicles such as mobility scooters, motorcycles, all-terrain vehicles and scooters. The present application incorporates U.S. Pat. No. 8,540,214 by reference. Said patent application and patent are incorporated herein by reference in their entirety.

BACKGROUND ART

A number of different vehicle lifts exist. However, these lifts often are heavy and difficult to operate and require significant space for operation extending behind a master vehicle, such as an RV or truck. Said lifts need sizable power plants to lift vehicles. Many lifts are either cable or light duty gear driven that are either not powerful enough to lift heavier loads or do not allow for a variety of cargo. These lifts also require complex locking mechanisms to secure the lifted vehicles in place. Accordingly, a vehicle lift is needed that is lockable, operates in a more confined space and makes an efficient use of lifting power.

Over that past few years larger size mobility scooters have become available as well as the demand for carrying smaller ATV's and motorcycles have also increased. In the past, there were mainly two categories of cargo carrying lifts for the consumer recreational market. The first category was a small and lightweight lift that was designed to lift and carry a small mobility scooter that could be installed on a passenger car such as those shown in, inter alia, U.S. Pat. Nos. 6,007,290 and 6,887,027. However, the prior art in this category was designed for smaller cargo and smaller carrying vehicle and have difficulty carrying larger or heavier cargo. The second category of cargo carrying lifts is larger, heavier lifting systems that were designed to carry large motorcycles, ATV's and other heavy cargo. Examples of this category of lifts are shown in U.S. Pat. Nos. 5,456,564; 6,884,018 and 8,540,214. These lifts provided much more lifting and carrying capacity than the first category. However, the larger capacity cargo carrying lifts have disadvantages as well. For example, this category of lifts is larger and heavier and requires a larger and heavier vehicle to support the weight of the lift and its cargo. This category of prior art lifts is typically installed on larger motor homes and cannot be installed on smaller vehicles such as passenger cars, pickup trucks and Class B and C mini-motorhomes.

The mid-size and mini motor home market has grown faster than any other recreational vehicle segment of the market. However, these smaller, lighter chassis vehicles are not ideal for either of the two categories of cargo carrying lifts described above. The first category of small and light weight lifts are generally too small for larger mobility scooters, motorcycles and other cargo that have become increasingly popular and the first category of lifts offer no towing apparatus to tow a second vehicle with the first cargo-carrying vehicle. The second category of lifts referenced above can offer the lifting and carrying capacity to carry larger and heavier cargo and can offer a towing apparatus to tow a second vehicle. However, the lifts from this category are too large and heavy to be installed on smaller vehicles such as class "C & B" (e.g. mini motor home) chassis. Accordingly, there exists a need for an improved lift for smaller vehicles that can tow a second vehicle and that has a larger platform that can accommodate mobility scooters, motorcycles and other cargo.

SUMMARY OF THE INVENTION

The present invention is a vehicle lift. In particular, the present invention is directed to a vehicle lift that has an adjustable vehicle receiver mount that is vertically adjustable and horizontally adjustable. The vehicle receiver mount has two lifting arms and two support arms pivotally attached. The lifting arms are each pivotally attached to a platform shoe and the support arms are attached to vertical rotation cups. The extruded aluminum vehicle platform is pivotally mounted on four pivot arms. The pivot arms are pivotally attached to the platform. The lift is attached to the vehicle receiver mount and is also attached to a crossbar mounted between the two lifting arms. The drive is preferably a single unit hydraulic drive. The vehicle receiver mount also has a towing receiver. The vehicle platform preferably has two channels with tethering and anchoring hardware, a vehicle stop and entrance ramp mounted on the channels.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a vehicle lift.

Figure 1:
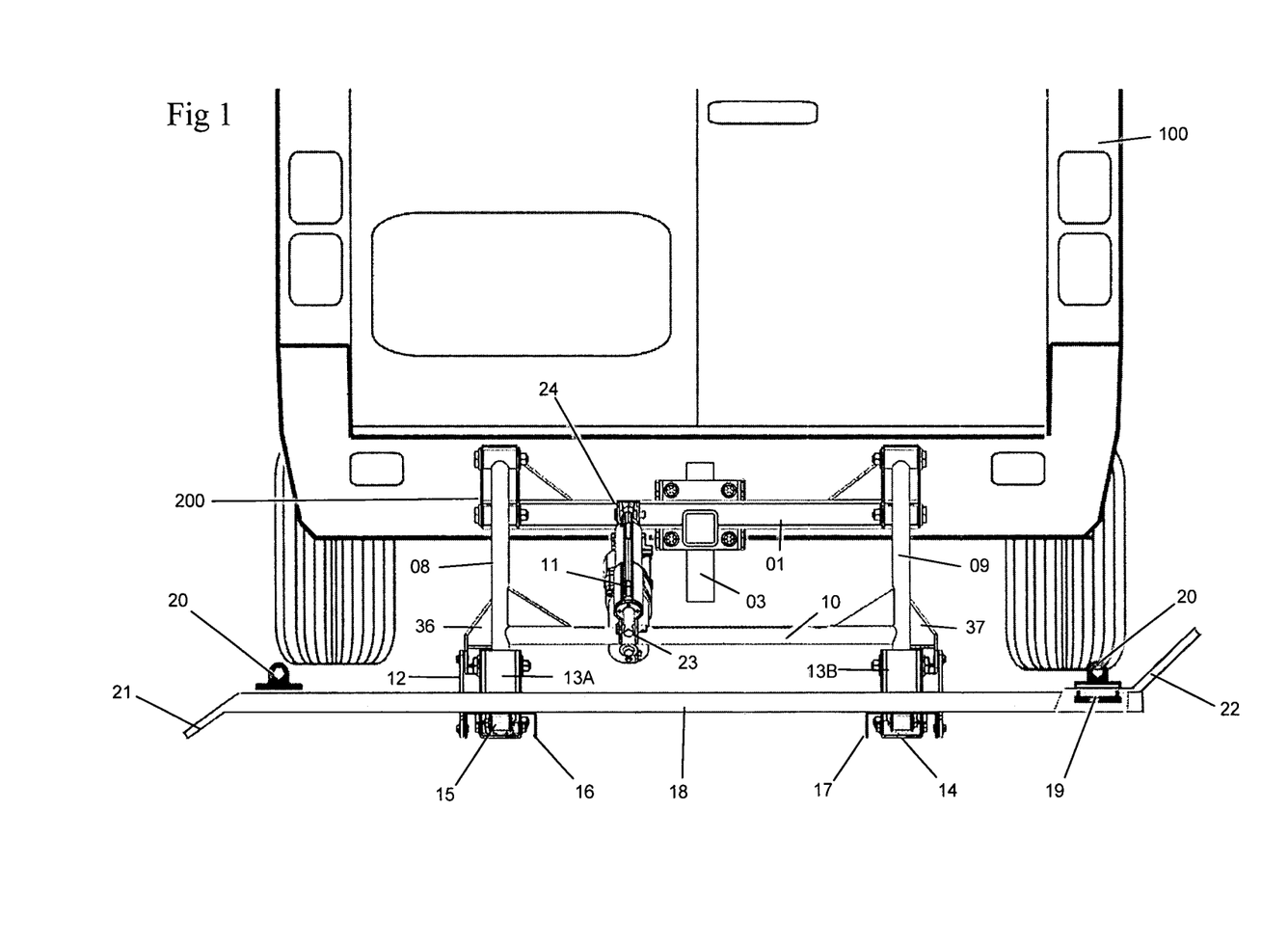
FIG. 1 is a front perspective front view of a preferred embodiment of the invention in a lowered position.

Referring now to FIG. 1, a preferred embodiment of the vehicle lift 200 is shown attached to a vehicle 100. The vehicle lift 200 shown in FIG. 1 is in a lowered position, preferably so that a vehicle can be loaded onto the lift. A vehicle platform 18 is shown mounted on a first platform base mount 16 and second platform base mount 17. The vehicle platform 18 shown is preferably wide enough for a motorcycle or mobility scooter or ATV (not shown) to rest on the platform 18. The platform 18 also preferably comprises a tire stop 22 to hold a front tire for a mobility scooter, motorcycle or other vehicle to be carried and an entrance ramped edge 21 to more easily roll a vehicle tire or hand cart aboard the platform 18. FIGS. 12a, 12b, 12c and 12d show the tire stop 22 and entrance ramped edge 21 in more detail. Preferably, each part 21, 22 is identical in configuration and need only be reversed for installation on one side of platform 18 or the other. The platform 18 is preferably made from extruded aluminum (though other materials such as steel could be used). The use of extruded aluminum for the platform 18 reduces the weight of the platform 18 and allows channels to be built into the platform. Preferably, the platform 18 has channels 33 built into the bottom surface of the platform 18 to accommodate an anchoring system 25 to secure the platform 18 to the platform base mounts 16,17 and channels 32 built into the top surface of the platform 18 to accommodate an anchoring system 19, 20 to secure carried vehicles and/or cargo in addition to accommodating the mounting of the tire stop 22 and entrance ramped edge 21 and other accessories (not shown) that may be added to the vehicle cargo carrying lift 200 (refer to FIG. 4 for a more detailed view).

Figure 4:
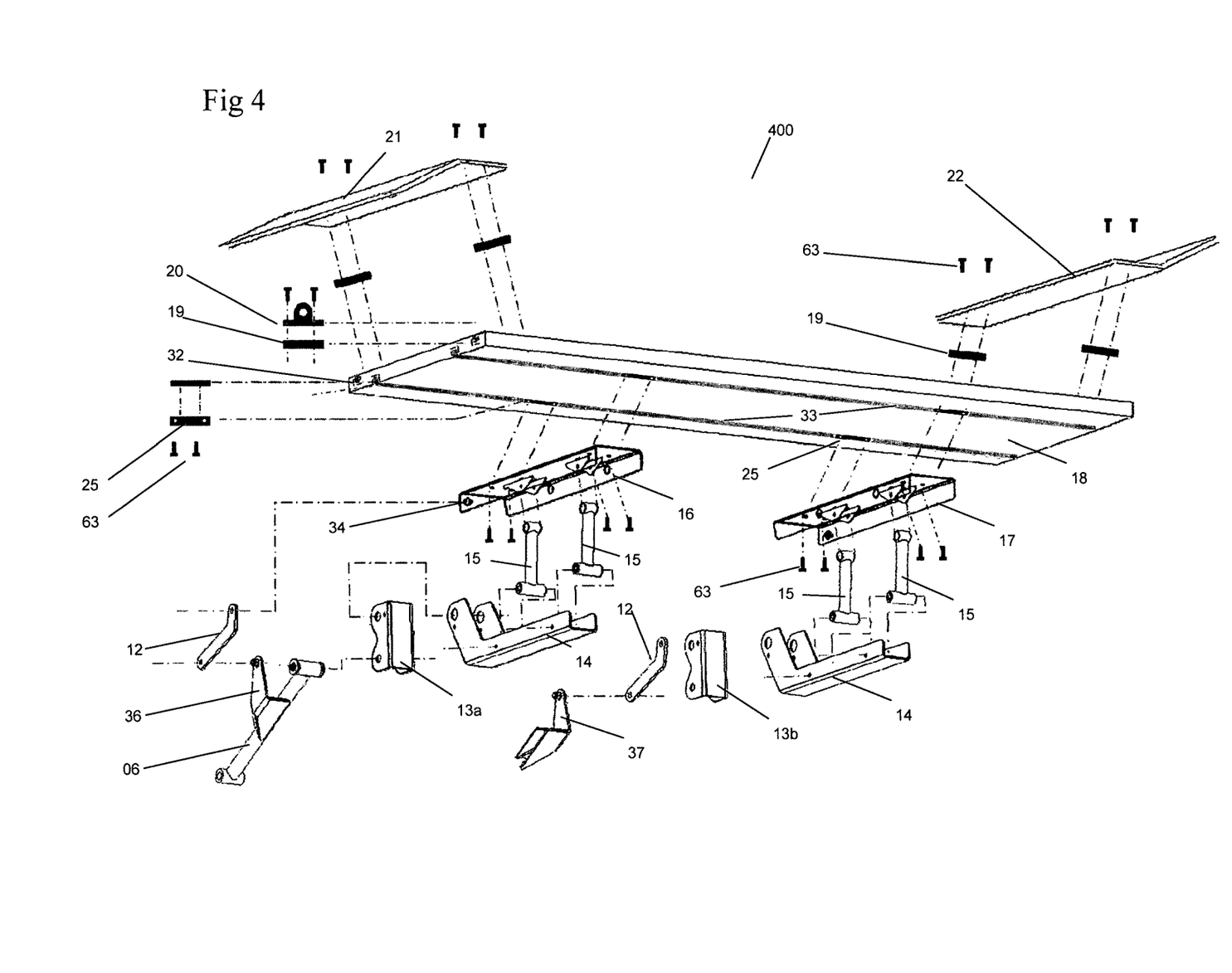
FIG. 4 is a bottom/underside perspective exploded view of a preferred embodiment of a portion of the invention.

Referring now to FIG. 4, the first and second platform base mount 16, 17 shown are pivotally attached to four pivoting arms 15 that are pivotally attached to platform shoes 14. The platform shoes 14 are pivotally attached to vertical rotation cups 13a, 13b and lifting arms 08, 09 (shown in FIG. 1). The vertical rotation cups 13a, 13b are also pivotally connected to the first and second support arms 06, 07 (shown in FIG. 7.) The lifting arms 08, 09 and support arms 06, 07 are pivotally attached to a mount frame 01. As shown in FIG. 1, a reinforcing crossbar 10 is attached between the first and second lifting arms 08, 09 and one end of a hydraulic actuator 11 is pivotally connected to an upper drive mount 23 on the reinforcing crossbar 10 and the other end of the hydraulic actuator 11 is pivotally attached to a lower drive mount 24 located on the mount frame 01. Furthermore, the platform base mounts 16, 17 have a pivot mount 34 welded or bolted to the outer side of platform base mounts 16, 17. The platform base mounts 16, 17 are pivotally connected to first and second pulling arm mounts 36, 37 that are connected to the support arms 06, 07 by pulling arms 12 (as shown in FIGS. 2 and 4) at pivot mounts 34.

Figure 2:
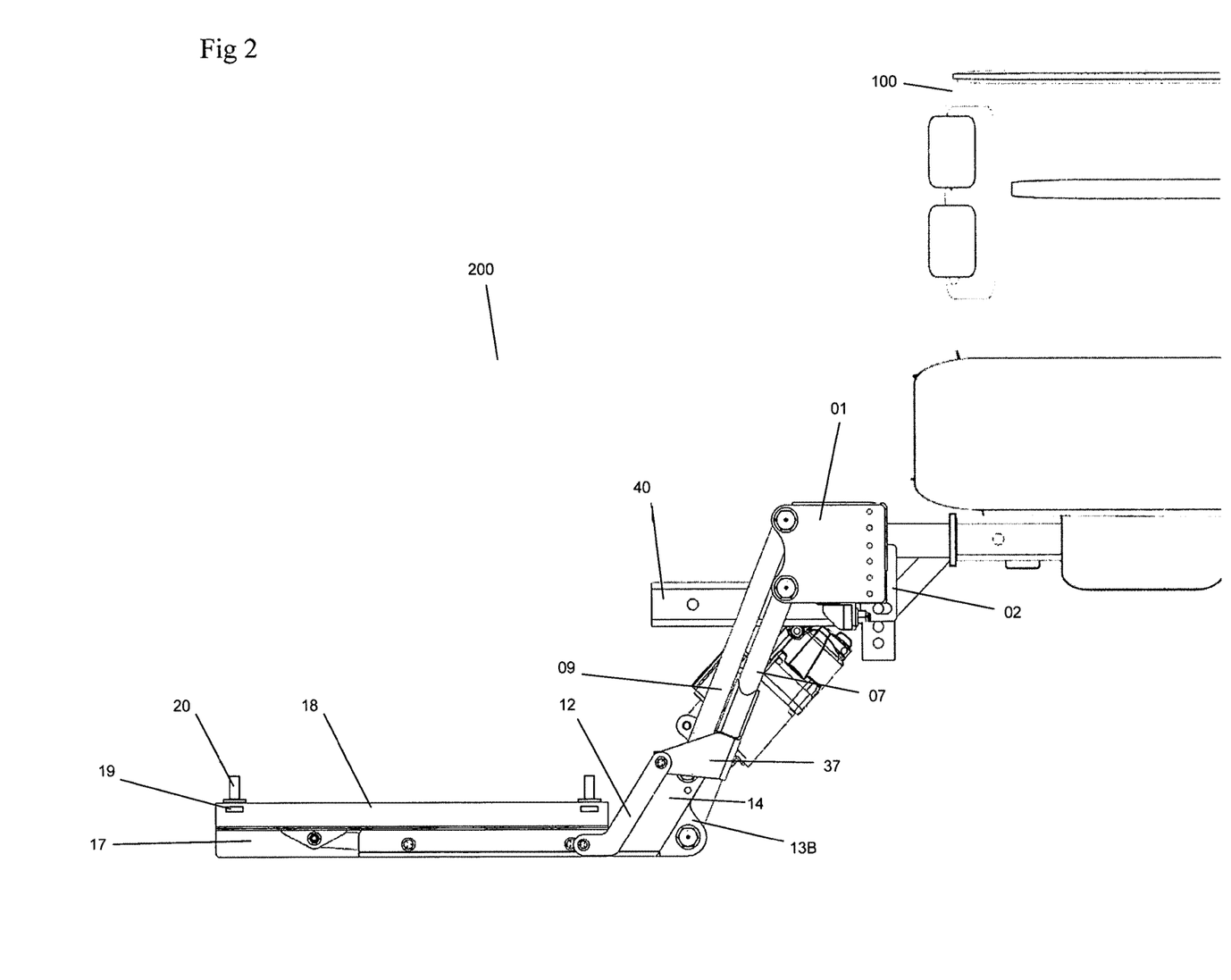
FIG. 2 is a side perspective side view of a preferred embodiment of the invention in a lowered position.

Referring now to FIG. 2, a side view of a preferred embodiment of the lift 200 is shown. The vehicle lift 200 is shown in the lowered position and mounted to a vehicle 100. (See FIG. 7 for details on mounting). The vehicle platform 18 is shown mounted on the second platform base mount 17. The vehicle platform 18 is shown without the tire stop 22 to show the installed position of the cargo anchoring system 19, 20. As shown in FIG. 2, the first end of the pulling arm 12 is pivotally attached to the second platform base mount 17 and the second end of the pulling arm 12 is pivotally attached to the second pulling arm mount 37 that is connected to the second support arm 07. As show in FIG. 2, a trailer hitch towing receiver 40 is attached to the main frame body 01.

Figure 3:
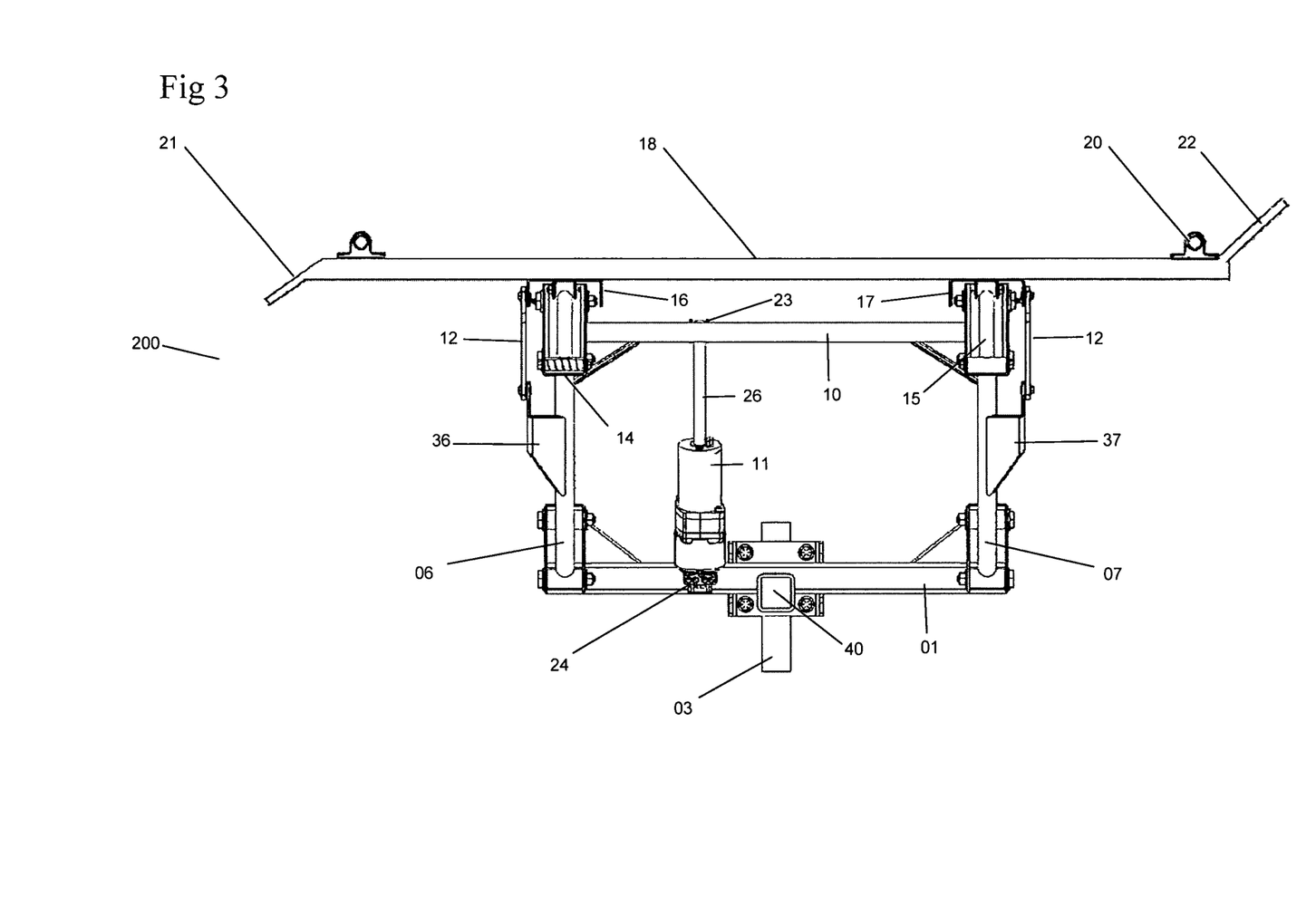
FIG. 3 is a front perspective front view of a preferred embodiment of the invention in a raised position.

Referring now to FIG. 3, a preferred embodiment of the vehicle lift 200 is shown in a raised position. The vehicle lift 200 is preferably raised by a hydraulic actuator drive 11. The drive 11 shown is a hydraulic actuator with piston and cylinder configurations, hydraulic pump, hydraulic oil reservoir and motor control built into a single unit. An example of such a unit is a Parker Hydraulics Electro Hydraulic Actuator EC7LN-BEA-8B4810-CCEN. However, the lift 200 can utilize electric actuators or equivalent devices. The drive 11 is preferably operated by a 12v battery source (not shown). The drive 11 is preferably pivotally attached at a lower drive mount 24 mounted to the main frame body 01 and at an upper drive mount 23 attached to the reinforced crossbar 10 and lifting arms 08, 09 shown in FIG. 1. The drive 11 preferably raises the vehicle platform 18 and its cargo, if any, by extending a drive rod 26 that pushes on the upper drive mount 23 and drives the lifting arms 08, 09 upward. Because the lifting arms 08,09 are pivotally connected to the vertical rotation cups 13a, 13b, this causes the support arms 06, 07 connected to pulling arm mounts 36, 37 to raise at the same rate. As the pulling arm mounts 36, 37 rise, the mounts 36, 37 pivot backwards causing a pulling force on the connected pulling arms 12 which, in turn, cause the four pivot arms 15 to raise and pivot backward by pulling on the first and second platform mount base 16, 17. The platform shoes 14 are pivotally mounted to the first and second lifting arm 08, 09 and the vertical rotation cups 13a, 13b thus causing the platform shoes 14 to remain in consistent relationship to the first and second lifting arms 08, 09 during operation.

Figure 10:
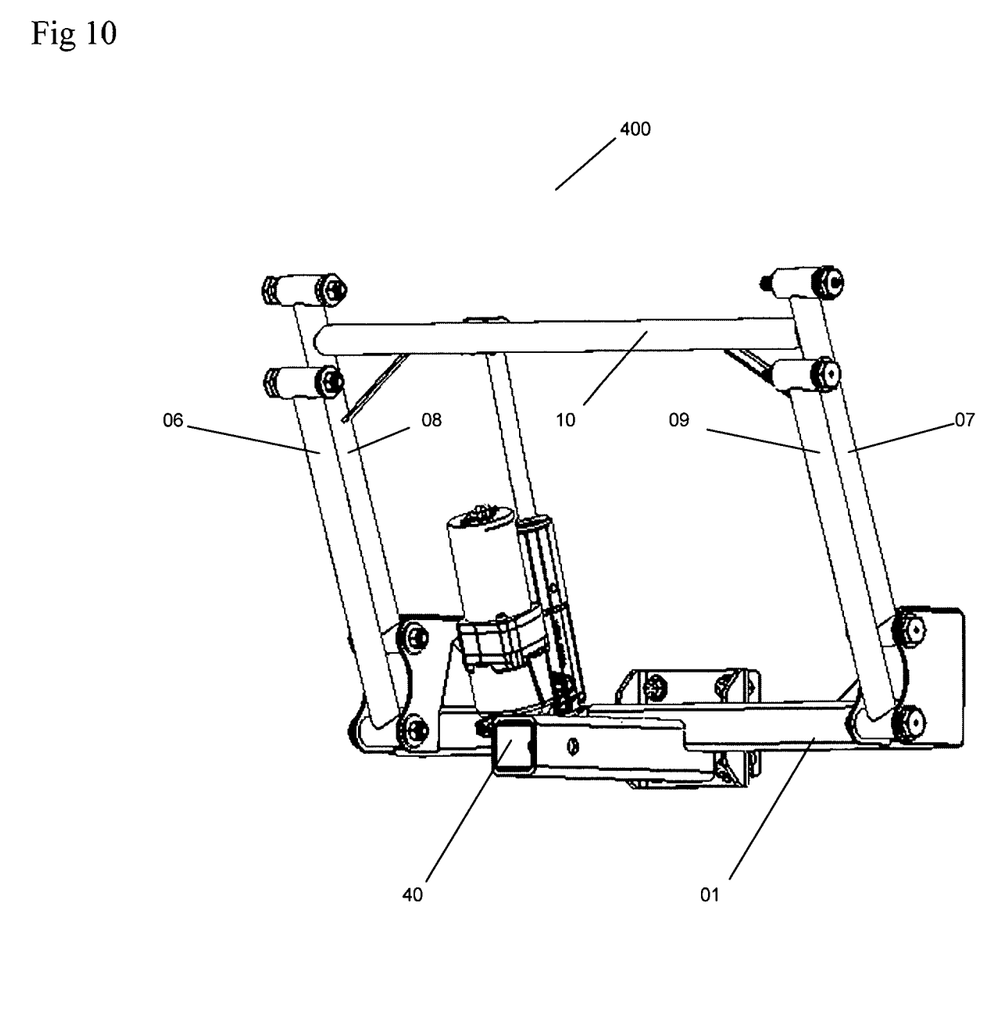
FIG. 10 is a perspective front view of a preferred embodiment of the first parallelogram apparatus.
Figure 11:
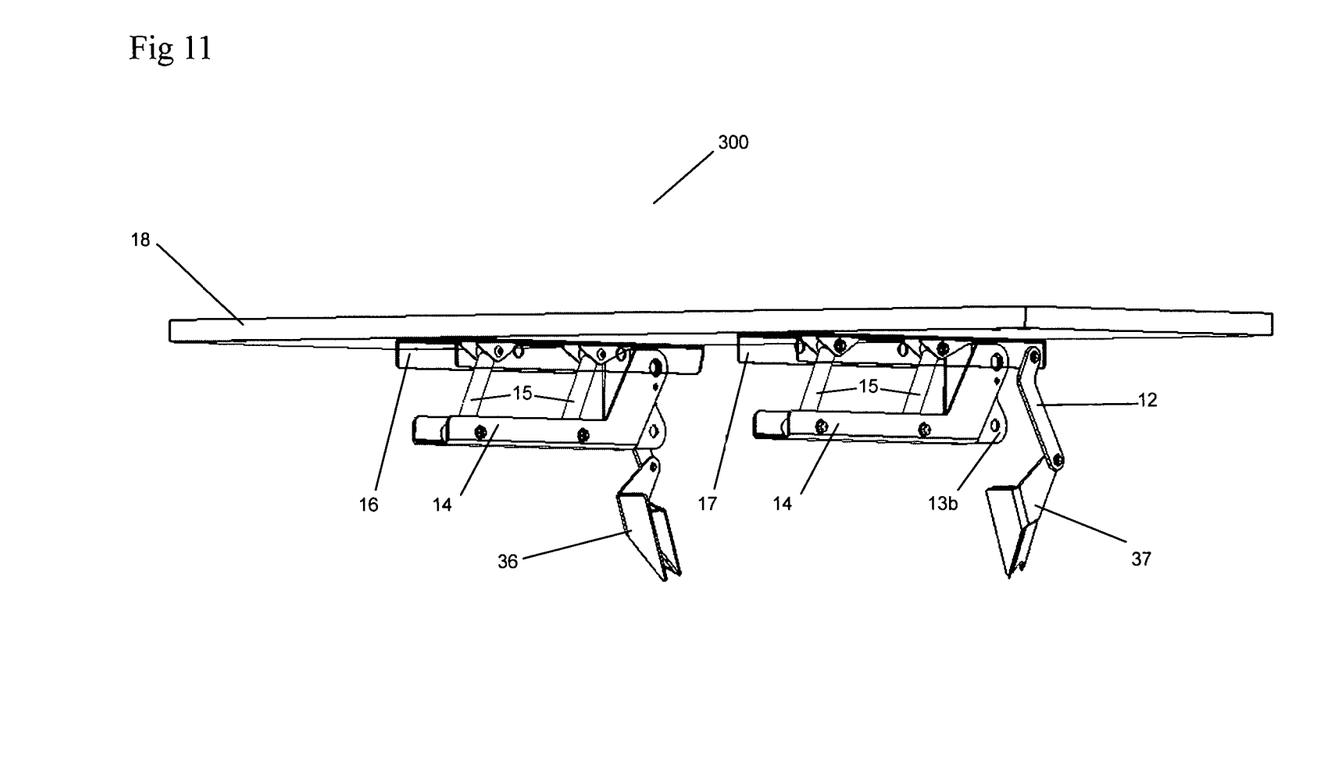
FIG. 11 is a perspective front view of a preferred embodiment of the second parallelogram apparatus; and, FIG. 12*a* is a side view diagram of a preferred embodiment of the platform with an entrance ramp edge and tire stop.
Figure 12A:
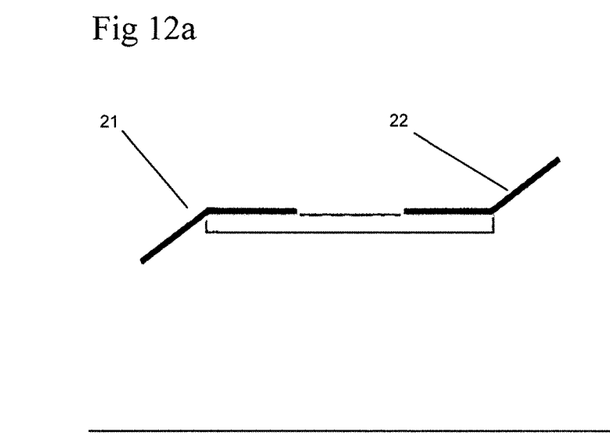
Figure 12B:
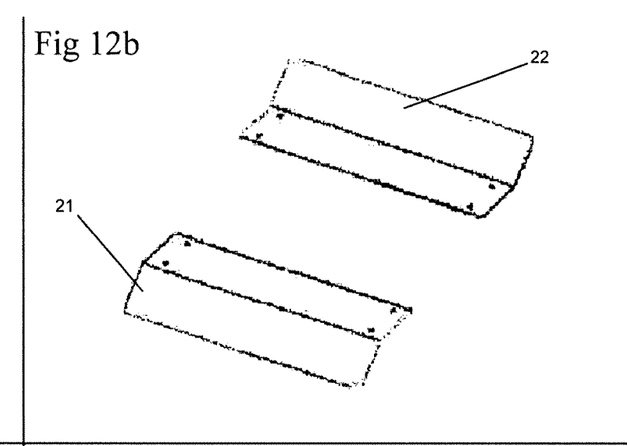
FIG. 12*b* is top perspective view of preferred embodiments of the entrance ramp edge and tire stop.
Figure 12C:
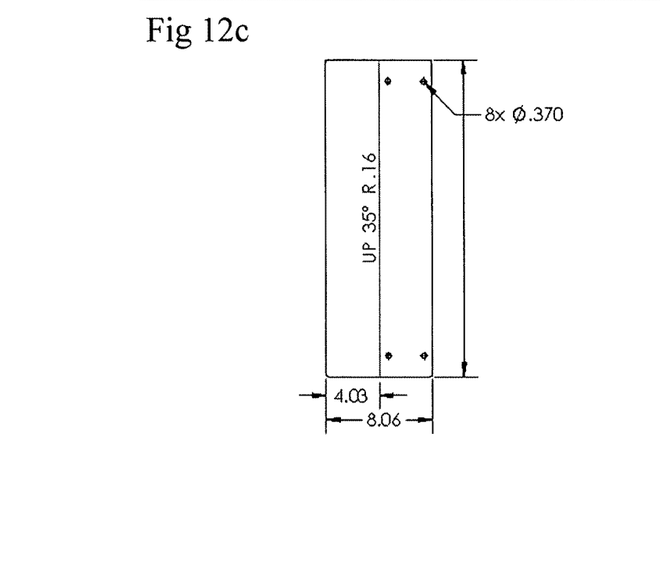
FIG. 12*c* is a top view of a preferred embodiment of an entrance ramp edge/tire stop.
Figure 12D:
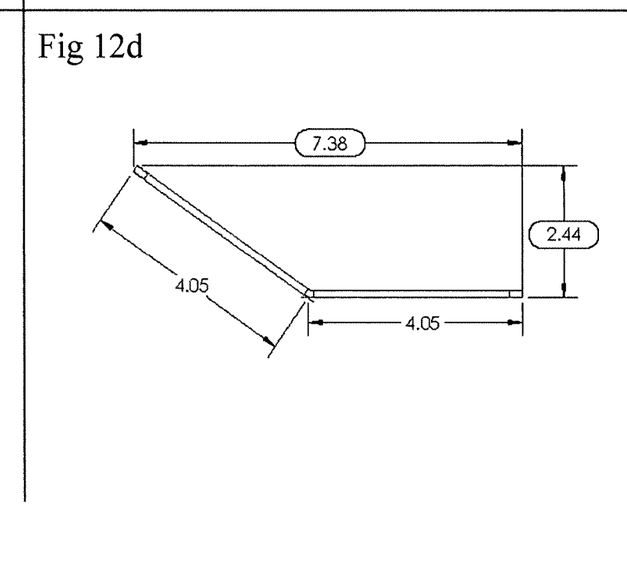
FIG. 12*d* is a side view of preferred embodiment of an entrance ramp edge/tire stop.

In general, the preferred embodiment of the present invention comprises two separate parallelogram apparatuses. Referring now to FIGS. 10 and 11, preferred embodiments of first (or lower) 400 and second (or upper) 300 parallelogram apparatuses are shown. The two separate parallelogram apparatuses allow for more fluid and adjustable lifting of the platform 18. The first or lower parallelogram structure 400 and hydraulic apparatus 11 move the lifting arms 8,9 and support arms 6,7 up and down. At the same time, the upper or second parallelogram structure 300 is in a pivoting engagement with the lower parallelogram structure 400 while the lifting arms 8,9 are moved between the ground and a designated cargo carrying height. The upper parallelogram structure 300 also is provided with platform mounts 16, 17 attached to pivoting arms 15 that engage the platform 18 in a pivoting motion such that movement of the lower parallelogram 300 acts to raise and lower the pivoting arms 15 and platform 18 in unison while maintaining a horizontal orientation of the platform 18 for supporting cargo. The advantage of the double parallelogram mechanism structure is that while other carrying lifts cantilever the cargo behind the lifting structure the new invention platform cargo is pivotally raised over the lifting arms and the new invention's frame structure. This provides more carrying capacity, stability and ground clearance.

Referring now to FIG. 4, a preferred embodiment of a second parallelogram apparatus 400 is shown in an exploded view. As discussed above, the platform 18 is designed with channels 33 built into the bottom surface of the platform 18. The channels 33 accommodate an anchoring system 19, 20 to secure carried vehicles and/or cargo; accommodate mounting of the tire stop 22 and entrance ramped edge 21; and, allow attachment of the platform 18 to the platform base mounts 16,17 using anchoring sliders 25, 19. The anchoring sliders 25, 19 slide into channels 32, 33 and are preferably connected with bolts 63 to the platform base mount 16,17. As the bolts 63 are tightened, the anchoring system slider 25 clamps down on the channel 33 making a secure non-slip connection between the platform base mounts 16,17 and the platform 18. The first and second platform base mounts 16, 17 shown are preferably pivotally attached to four pivoting arms 15 that are, in turn, pivotally attached to a set of platform shoes 14. The vertical rotation cups 13*a*, 13*b* are pivotally attached to the first and second support arms 06, 07, the first and second lifting arms 08, 09 not shown and the platform shoes 14. The rotation cups 13*a*, 13*b* keep the support arms 08, 09 and the lifting arms 06, 07 pivoting together simultaneously and keep the platform shoes 14 parallel to the ground as the lift 200 raises and lowers. The platform shoes 14 are connected to the first and second pulling arm mounts 36, 37 by the pulling arms 12.

Figure 5:
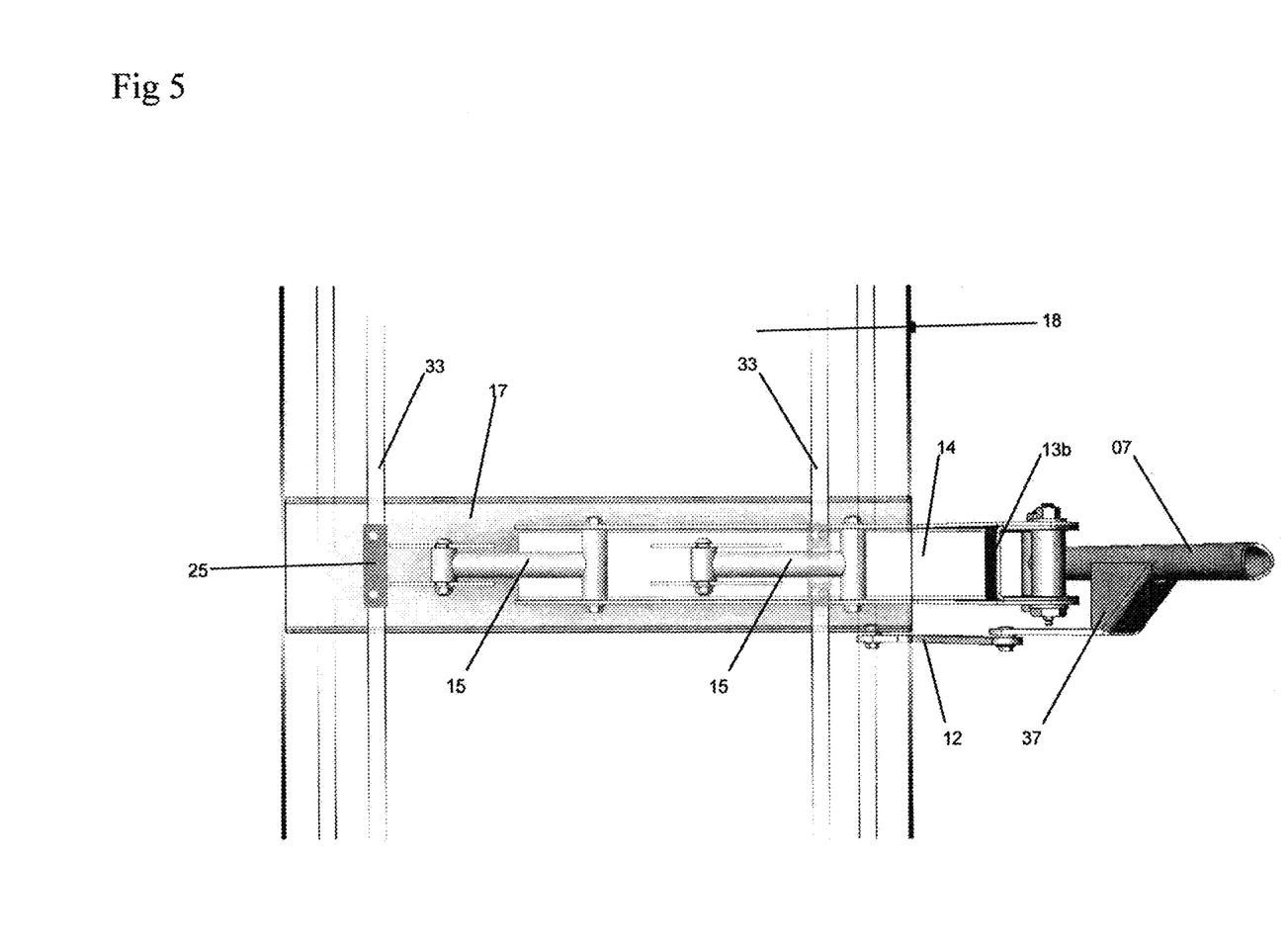
FIG. 5 is a transparent top view of a preferred embodiment of the right side platform assembly mechanism.

Referring now to FIG. 5, FIG. 5 is a top view of the platform 18 that is made transparent to show the connections that would be otherwise hidden by the platform 18. The FIG. 5 view shows the anchoring slider 25 inserted into the platform channel 33. The platform base mount 17 is connected to the platform 18 using the anchoring slider 25. The pivoting arms 15 are pivotally connected to the second platform base mount 17 and to the platform shoe 14. The pulling arm 12 is pivotally attached to the second platform base mount 17 and second pulling arm mount 37.

Figure 6:
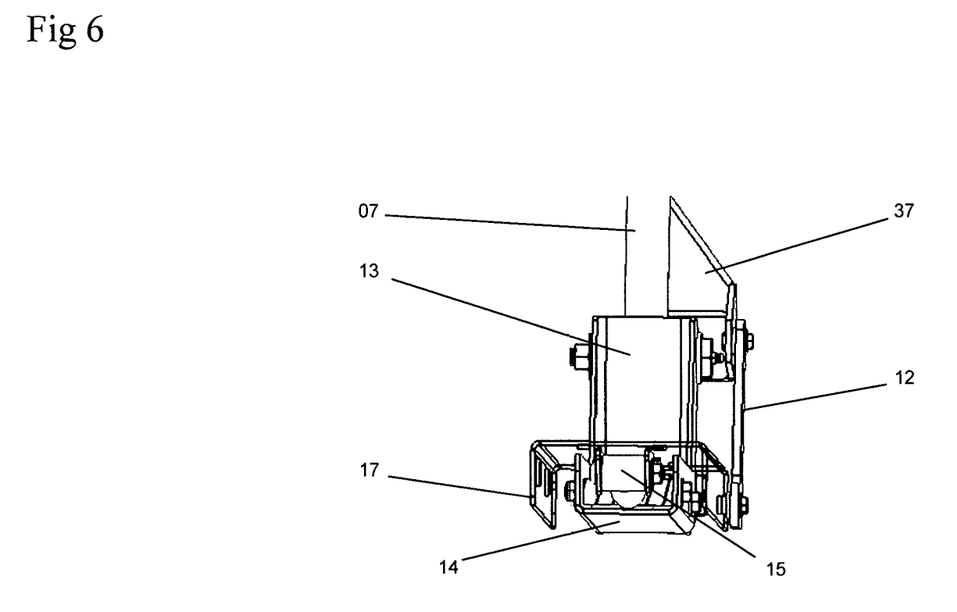
FIG. 6 is a front view of a preferred embodiment of the right side platform assembly mechanism.

Referring now to FIG. 6, a front view of the second platform base mount 17 and the platform shoe 14 in the lowered position is shown. When the second parallelogram apparatus 400 is in the lowered position, the second platform base mount 17 lays flat and encompasses the platform shoe 14 with the pivoting arms 15 folded flat in between the second platform base mount 17 and the platform shoe 14. This configuration lowers the height of the platform assembly for easier ground level loading and unloading.

Figure 7:
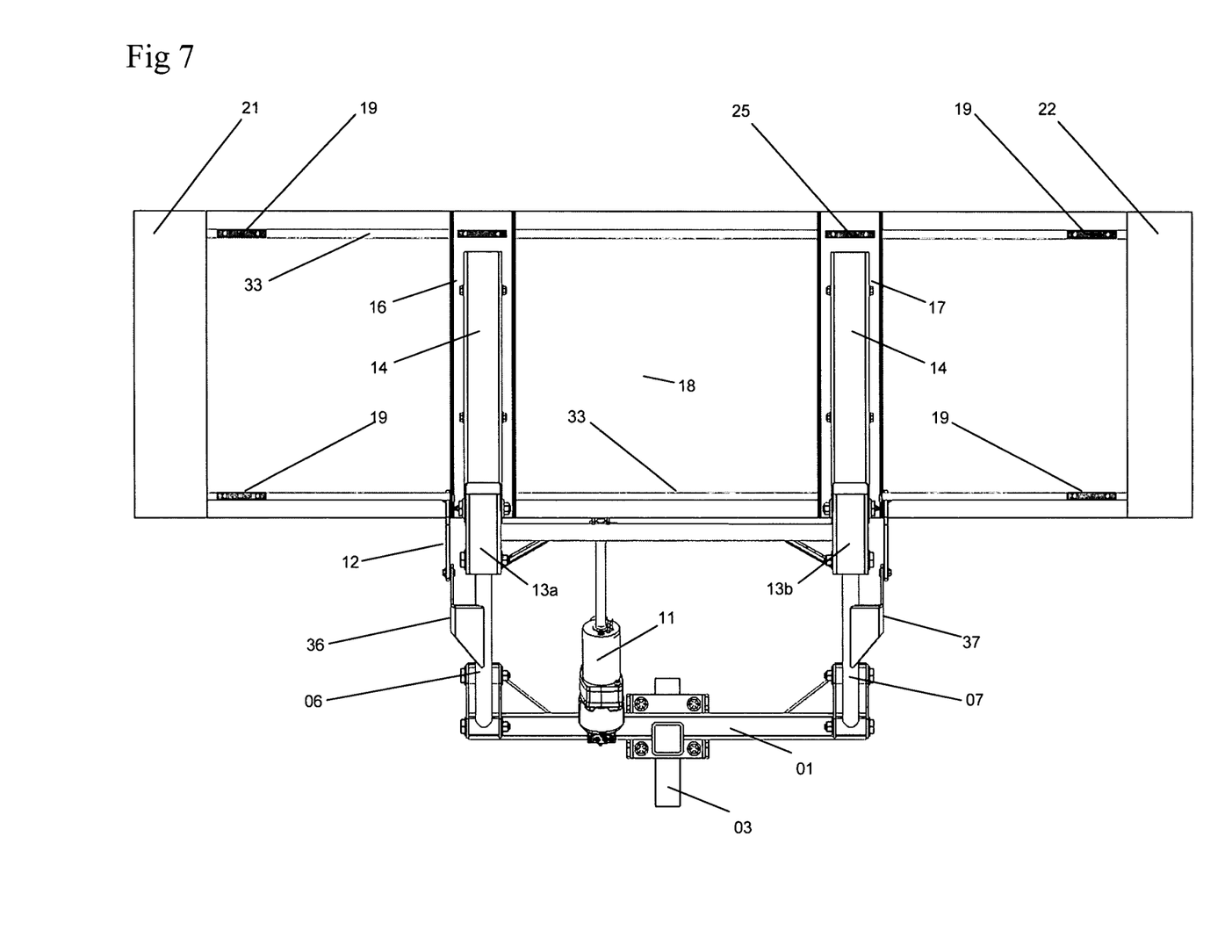
FIG. 7 is a bottom/underside perspective view of a preferred embodiment of the invention in a folded/stored position.
Figure 8A:
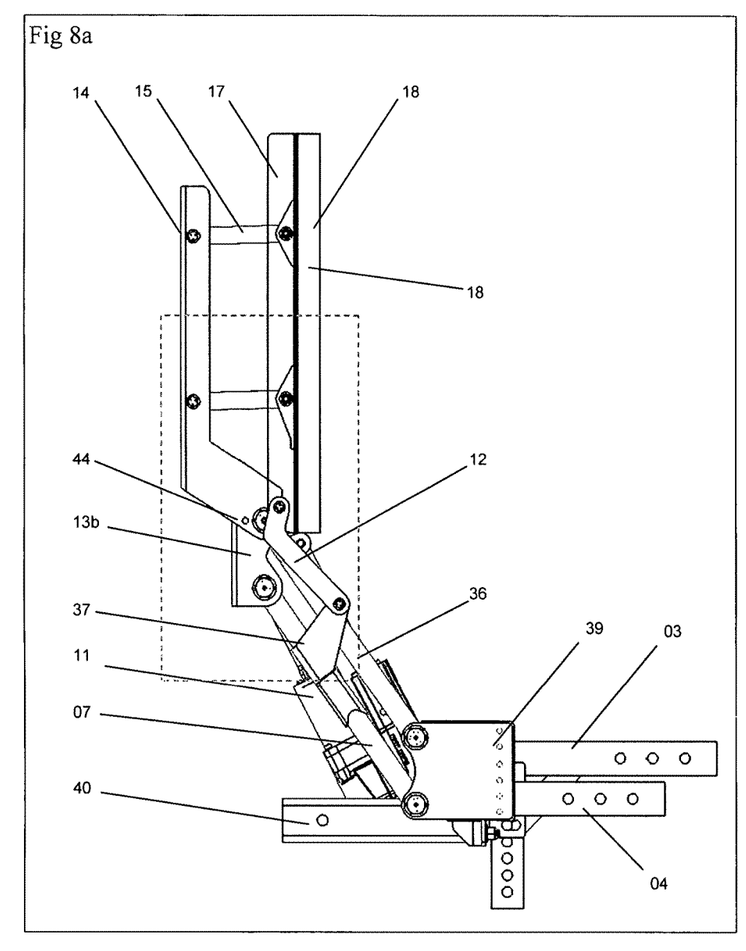
FIG. 8*a* is a side view of a preferred embodiment of the invention in a folded/stored position.
Figure 8B:
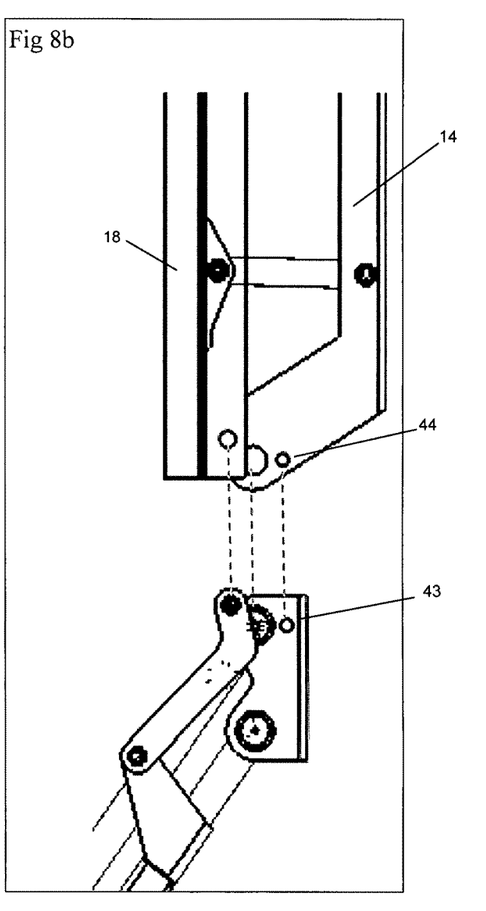
FIG. 8*b* is a close up view of the embodiment of FIG. 8*a* at the platform shoe and pin mounts.

Referring now to FIG. 7, a bottom view of a preferred embodiment of the vehicle lift 200 and its platform assembly 18 is shown in a folded storage position with the two platform shoes 14 and platform 18 locked in a vertical position. Built into the platform shoe 14 and the vertically rotation cups 13*a*, 13*b* is a set of pin mounts 43, 44 such that, when the platform 18 is raised vertically, the pin mounts 43, 44 align and can be locked together with a automatic snapping pin or manually with a pin and clip. The platform shoe 14 is pivotally mounted to the vertical rotation cups 13*a*, 13*b* and the pulling arms 12. As the platform 18 is raised to the vertically stored position, the platform shoes 14 rotate vertically from the vertical rotation cups 13*a*, 13*b* while simultaneously, the platform base mount 16, 17 rotates vertically from pulling arm 12 causing the platform 18 to raise vertically. When the platform 18 is completely vertical, the pin mounts 43, 44 are aligned and secured to hold the platform 18 in place. This is best shown in FIGS. 8*a* and 8*b*.

Figure 9:
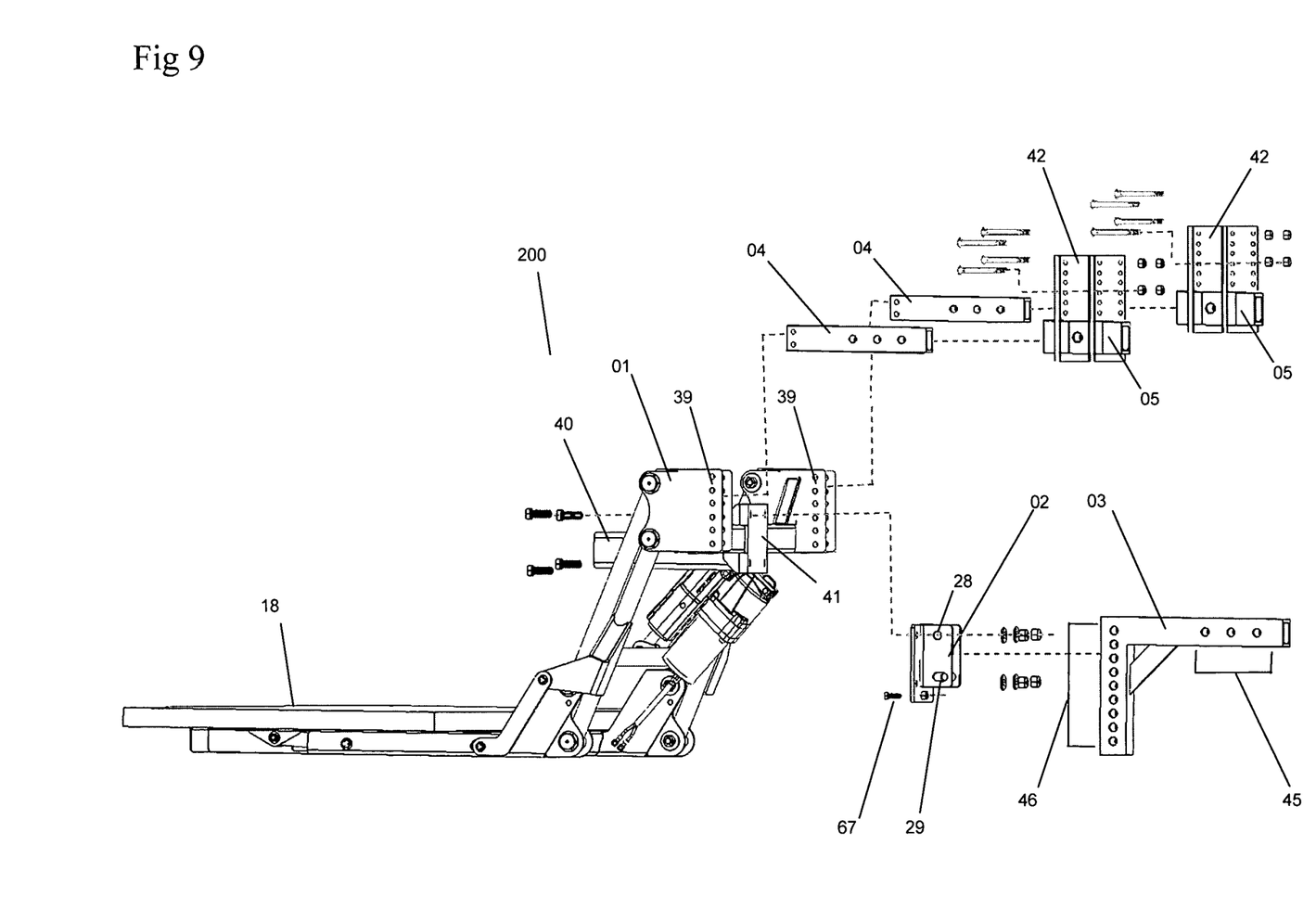
FIG. 9 is a perspective side exploded view of a preferred embodiment of the invention's mounting system.

Referring now to FIG. 9, a side view of a preferred embodiment of the lift 200 and stabilizing/mounting system is shown in a partially exploded view. The lift 200 preferably installs to an existing trailer hitch towing receiver on vehicle 100 using an adjustable receiver mount 03 that is horizontally adjustable along the row of holes 45. This allows the lift 200 to be installed on a wide range of vehicles and different receiver configurations. The adjustable receiver mount 03 is also adjustable vertically along row of holes 46. This allows a user to adjust the installed height of the lift 200 to the ground and, when installed to the adjusting plate 02, the level of the lift platform 18 can be adjusted to the desired level. The adjusting plate 02 is attached to the lift 200 at mounting frame plate 41. The level of platform 18 can also be changed by using a shim/washer and bolt 67 to raise/lower the outboard side of platform 18 relative to the ground. The upper mounting hole 28 of adjusting plate 02 is fixed by bolting (not shown) to the adjustable receiver mount 03 while the lower mounting hole is pivotally adjustable with a slotted hole 29. By fixing the upper point of the adjusting plate 02 and making the lower point of adjusting plate 02 pivotable, the surface of the adjusting plate 02 changes the pitch of the lift frame body 01 that is bolted to the adjustable plate 02. To provide additional stability and increase the strength of the installation, two outboard adjustable tether arms 04 are installed to the frame body 01 (at frame mounts 39) and that connect to a set of adjustable tether anchors 05 that have adjustable plates 42 made part of the adjusting tether anchors 05. The tether anchors 05 are adjustable for the height of the vehicle 100's frame or trailer hitch receiver (not shown) making it possible to adapt the outside receiver parts to a wide range of vehicle configurations. The tether anchors 05 are made as a bolt-on easy installation with no welding or professional installation required.

Figure 13:
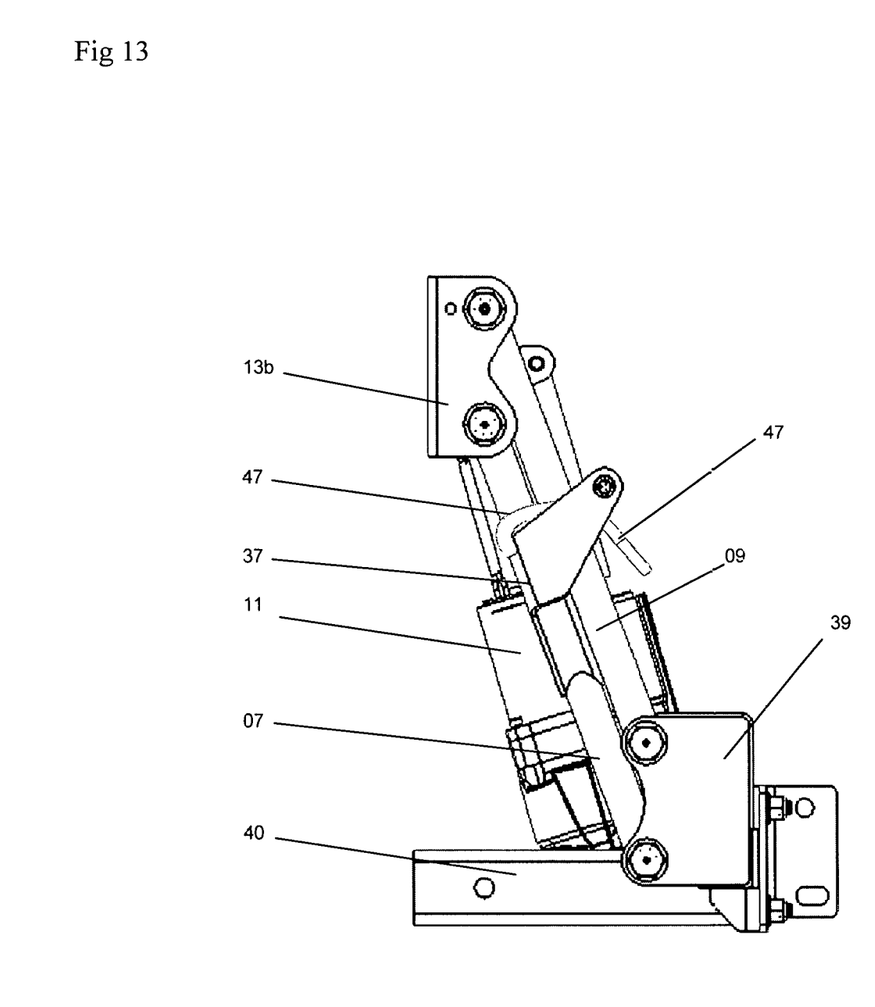
FIG. 13 is a side view of a preferred embodiment of a locking system for the present invention where the lift is in a stored position.
Figure 14A:
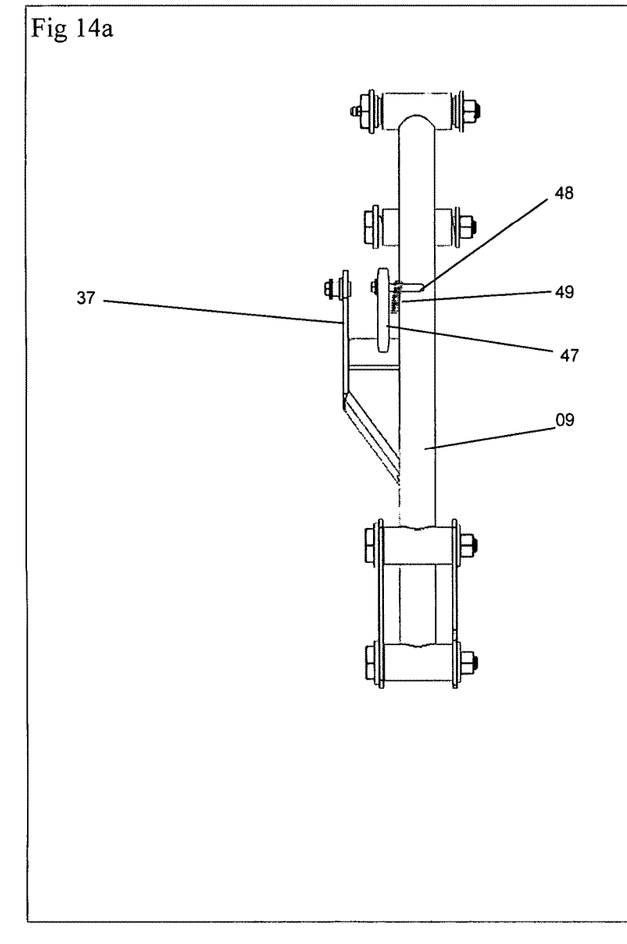
FIG. 14a is a top view of a preferred embodiment of the locking system.
Figure 14B:
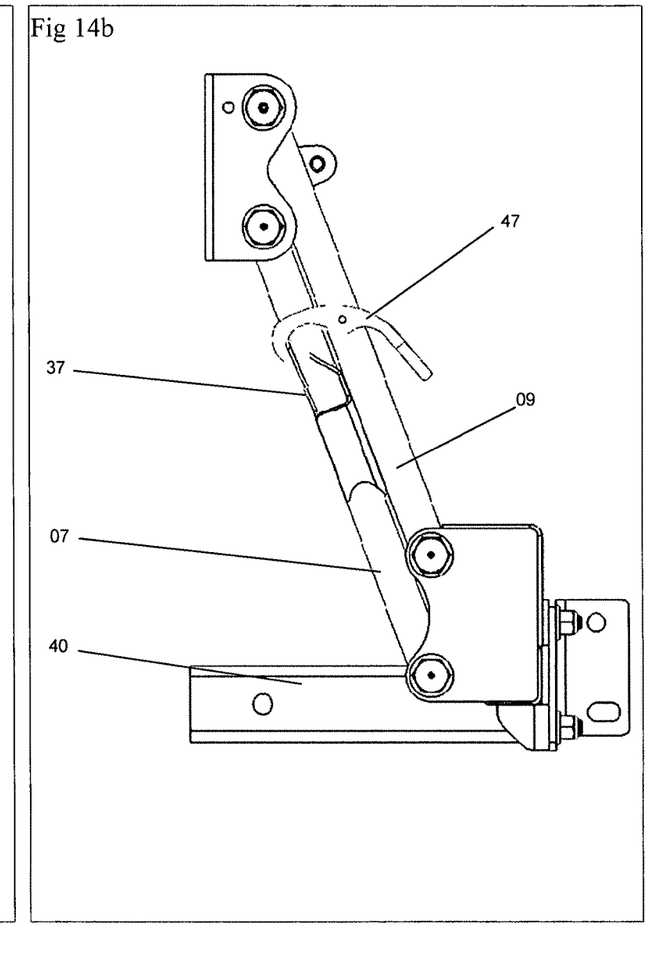
FIG. 14b is a side view of a preferred embodiment of the locking system.

Referring now to FIG. 13, a side view of a preferred embodiment of a locking system for the present invention is shown. The portion of the present invention shown is in the raised and locked position. The locking arm 47 is in the locked position. Referring to FIG. 14*a*, a lock arm mount 48 is attached to the second lifting arm 09 and the locking arm 47 is pivotally mounted to the lock arm mount 48. An end of lock return spring 49 is attached to the lock arm 47 and the opposing end of lock return spring 49 is attached to the lock arm mount 48. FIG. 14*b* is a side view of the preferred embodiment locking system. In FIG. 14*b*, the side plate of the pulling arm mount 37 is removed to show that the lock arm 47 preferably engages the lower side of the pulling arm mount 37. As the lift rises, the lock arm 47 engages the lower surface of the pulling arm mount 37 and secures the lift in the "up" or raised position until it is mechanically released.

Thus, an improved vehicle lift is described above that can tow a second vehicle and that has a larger platform that can accommodate mobility scooters, motorcycles and other cargo while installed on a smaller vehicle. In each of the above embodiments, the different positions and structures of the present invention are described separately in each of the embodiments. However, it is the full intention of the inventors of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A vehicle lift comprising:
   a vehicle trailer hitch receiver mount with two lifting arms and two support arms pivotally attached;
   where the lifting arms are each pivotally attached to a platform shoe and where the support arms are attached to vertical rotation cups;
   a vehicle platform pivotally mounted on four pivot arms;
   where the pivot arms are pivotally attached to the platform; and,
   a drive with a first end and a second end, where the first end is attached to the vehicle trailer hitch receiver mount and where the second end is attached to a crossbar mounted between the two lifting arms;
   where the vehicle platform comprises at least two channels with cargo tethering and cargo anchoring hardware and further comprising an entrance ramp and a vehicle stop removably mounted to the at least two channels.

* * * * *